US007964978B1

(12) United States Patent
Weissmann (10) Patent No.: US 7,964,978 B1
(45) Date of Patent: Jun. 21, 2011

(54) WIND TURBINE HAVING A BLADE RING USING MAGNETIC LEVITATION

(76) Inventor: Douglas Weissmann, Cayucos, CA (US)

( * ) Notice: Subject to any disclaimer, the term of this patent is extended or adjusted under 35 U.S.C. 154(b) by 344 days.

(21) Appl. No.: 12/287,200

(22) Filed: Oct. 6, 2008

(51) Int. Cl.
*F03D 9/00* (2006.01)
*H02P 9/04* (2006.01)
(52) U.S. Cl. .............................. 290/44; 290/55
(58) Field of Classification Search ............... 290/44, 290/55; 415/4.3, 4.5, 118, 228; 416/9, 61, 416/189, 244 R
See application file for complete search history.

(56) References Cited

U.S. PATENT DOCUMENTS

| 4,289,970 | A | * | 9/1981 | Deibert ........................ 290/44 |
| 4,720,640 | A | * | 1/1988 | Anderson et al. ............... 290/43 |
| 5,315,159 | A | | 5/1994 | Gribnau |
| 5,722,326 | A | | 3/1998 | Post |
| 5,765,990 | A | * | 6/1998 | Jones ............................ 415/2.1 |
| 7,233,129 | B2 | | 6/2007 | Erdman et al. |
| 7,239,036 | B2 | | 7/2007 | D'Atre et al. |
| 7,303,369 | B2 | | 12/2007 | Rowan et al. |
| 2003/0137149 | A1 | * | 7/2003 | Northrup et al. .............. 290/44 |
| 2007/0040385 | A1 | * | 2/2007 | Uchiyama ..................... 290/44 |
| 2009/0322094 | A1 | * | 12/2009 | Mahawili ...................... 290/55 |
| 2010/0133839 | A1 | * | 6/2010 | Bridwell ....................... 290/52 |
| 2010/0148515 | A1 | * | 6/2010 | Geddry et al. ................. 290/55 |

OTHER PUBLICATIONS

"Inductrack," Wikipedia.org, article, 2 pges, Aug. 12, 2008.
"Maglev (transport)," Wikipedia.org, article, 12 pages, Aug. 12, 2008.

* cited by examiner

*Primary Examiner* — Tho D Ta
(74) *Attorney, Agent, or Firm* — Stan Collier (57) ABSTRACT

The present invention is an improved wind turbine having multiple blades mounted in a turbine rotor. The tips of the blades are attached to a blade ring. The blade ring holds the blades in place, provides support to the rotor in a stator/guide track, provides a location for energy transfer either by mechanical means or electrical means, and provides at least one location for means for reducing friction between the rotor and the stator. The rotor may further include a device for controlling the direction of the rotor axis based upon the wind direction such as a rudder. The stator/guide track holds the blade ring, in a frictionless manner, and provides locations for levitation devices as well as energy transfer devices that complement devices on the blade ring. The guide track is mounted to a pedestal secured to the ground. The pedestal may also include devices for controlling the direction of the rotor.

7 Claims, 9 Drawing Sheets

WIND TURBINE HAVING A BLADE RING USING MAGNETIC LEVITATION

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable.

BACKGROUND OF THE INVENTION

1. Field of the Invention

The present invention relates generally to electrical energy producing devices, and, in particular, relates to electrical energy producing devices that harness natural forces, and, in greater particularity, relates to electrical energy producing devices that harness wind energy.

2. Description of the Prior Art

Access to relatively cheap energy has been the foundation of the modern American society. Because of its integral part in all aspects of commerce, significant increases in price have a dramatic affect on America life. From buying bread, driving cars, to heating houses, every thing becomes more expensive. The recent increase in the cost of oil per gallon in 2008 by speculators and oil producing countries, mostly foreign, has again sent up a red flag about our vulnerability to foreign powers. Numerous politicians have promised greater oil production in the United States, but that may only be a partial long-term answer to our energy needs. Technology companies related to energy are now starting to look with greater interest at alternative energy sources such as solar and wind to supplement and help reduce our dependency on oil.

In the past, wind related technology has centered on the use of large structures with aircraft type blades that are typically attached to an electric generator on a horizontal axis. Some environmentalists have opposed these devices because of their large size and the need to place them where wind is typically present such as along the coastlines and on mountain ridges, basically being visual pollution. To avoid some of these complications, for example, U.S. Pat. No. 7,239,036 discloses a linear motion wind driver power plant having a plurality of carriers moving around a connected track. Each carrier has a sail mounted thereto. The movement of the carrier by wind generates electricity to be placed on a power grid. U.S. Pat. No. 7,303,369 discloses a vertical axis wind turbine having a plurality of sail shaped blades around the vertical axis.

U.S. Pat. No. 7,239,036 discloses a typical wind turbine, FIG. 1, having a generator, FIG. 2, attached to a blade axis. U.S. Pat. No. 5,315,159 discloses a wind turbine having a rotor with blades with the blades attached to a central axis on a tower. FIG. 1c shows a rotor ring 6 attached to the outer blade tips. The rotor ring 6 engages a stator sector for generating electricity. FIG. 4a discloses the interaction of the rotor ring and the stator. U.S. Pat. No. 7,233,129 discloses a means for transferring energy in proper phase from a wind turbine to an energy grid.

U.S. Pat. No. 7,303,369 discloses a vertical axis wind turbine. A plurality of sail-like structures are attached to the central axis and to the ring-shaped base having locations therein for electricity generating magnets and coils. Magnetic levitation is used to assist in reducing friction between the turbine and the base support. U.S. Pat. No. 7,191,710 discloses the use of magnetic levitation and propulsion to generate electricity having a plurality of energy storage masses. Also, U.S. Pat. No. 5,722,326 by Post entitled, "Magnetic Levitation System for Moving Objects," discloses a system called Inductrack. Permanent magnets in the moving object interact with inductively loaded closed electrical circuits to produce a repelling force.

The above U.S. patents are incorporated by reference.

Accordingly, there is an established need for an improved wind turbine having a blade rotor for generating electricity distally located from the axis of rotation and further having means to minimize friction.

SUMMARY OF THE INVENTION

The present invention is directed at an improved wind turbine having a horizontal axis of rotation with electricity generating means located distally from the axis with magnetic levitation means for reducing the friction between the rotor and stator.

The present invention is an improved wind turbine having multiple blades mounted in a turbine rotor. The tips of the blades are attached to a blade ring. The blade ring holds the blades in place, provides support to the rotor in a stator/guide track, provides a location for energy transfer either by mechanical means or electrical means, and provides at least one location for means for reducing friction between the rotor and the stator. The rotor may further include a device for controlling the direction of the rotor axis based upon the wind direction such as a rudder. The stator/guide track holds the blade ring, in a frictionless manner, and provides locations for levitation devices as well as energy transfer devices that complement devices on the blade ring. The guide track is mounted to a pedestal secured to the ground. The pedestal may also include devices for controlling the direction of the rotor.

An object of the present invention is to provide an improved wind turbine with a horizontal axis of rotation having the electricity generating means located distally from the rotor axis.

It is another object of the present invention to provide an improved wind turbine with a horizontal axis of rotation having the electricity generating means located distally from the rotor axis and having the blade ring traveling within a guide track with magnetic levitation therein.

It is a further object of the present invention to provide an improved wind turbine with a horizontal axis of rotation having the electricity generating means located distally from the rotor axis further having means for controlling the direction of the rotor with one or more rudders.

It is still a further object of the present invention to provide an improved wind turbine with a horizontal axis of rotation having the electricity generating means located distally from the rotor axis wherein mechanical means converts the motion of the rotor into rotary motion for driving a generator.

It is yet a further object of the present invention to provide an improved wind turbine with a horizontal axis of rotation having the electricity generating means located distally from the rotor axis wherein the electricity generating means is mounted to the blade ring and stator/guide track.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE PREFERRED EMBODIMENTS

The present invention is directed at an improved wind turbine using magnetic levitation to reduce friction in the turbine and mountings.

The present invention is an improved wind turbine having multiple blades mounted in a turbine rotor. The tips of the blades are attached to a blade ring. The blade ring holds the blades in place, provides support to the rotor in a stator/guide track, provides a location for energy transfer either by mechanical means or electrical means, and provides at least one location for means for reducing friction between the rotor and the stator. The rotor may further include a device for controlling the direction of the rotor axis based upon the wind direction such as a rudder. The stator/guide track holds the blade ring, in a frictionless manner, and provides locations for levitation devices as well as energy transfer devices that complement devices on the blade ring. The guide track is mounted to a pedestal secured to the ground. The pedestal may also include devices for controlling the direction of the rotor.

The preferred embodiment of the improved wind turbine comprises a turbine rotor having one or more blades attached at one end to a center of the turbine rotor. The center being a horizontal axis of rotation of the turbine rotor with the blades attached at an opposite end to a blade ring. The blade ring travels within a circular guide track. The guide track is mounted to a rotatable base that is mounted to a tower being located in a preferred location having a sufficient wind to provide electrical power to a power grid. Means for generating electricity is attached to the blade ring and to the guide track. To further improve the operation of the wind turbine means for providing frictionless rotation of the blade ring in the guide track are included.

Figure 1A:
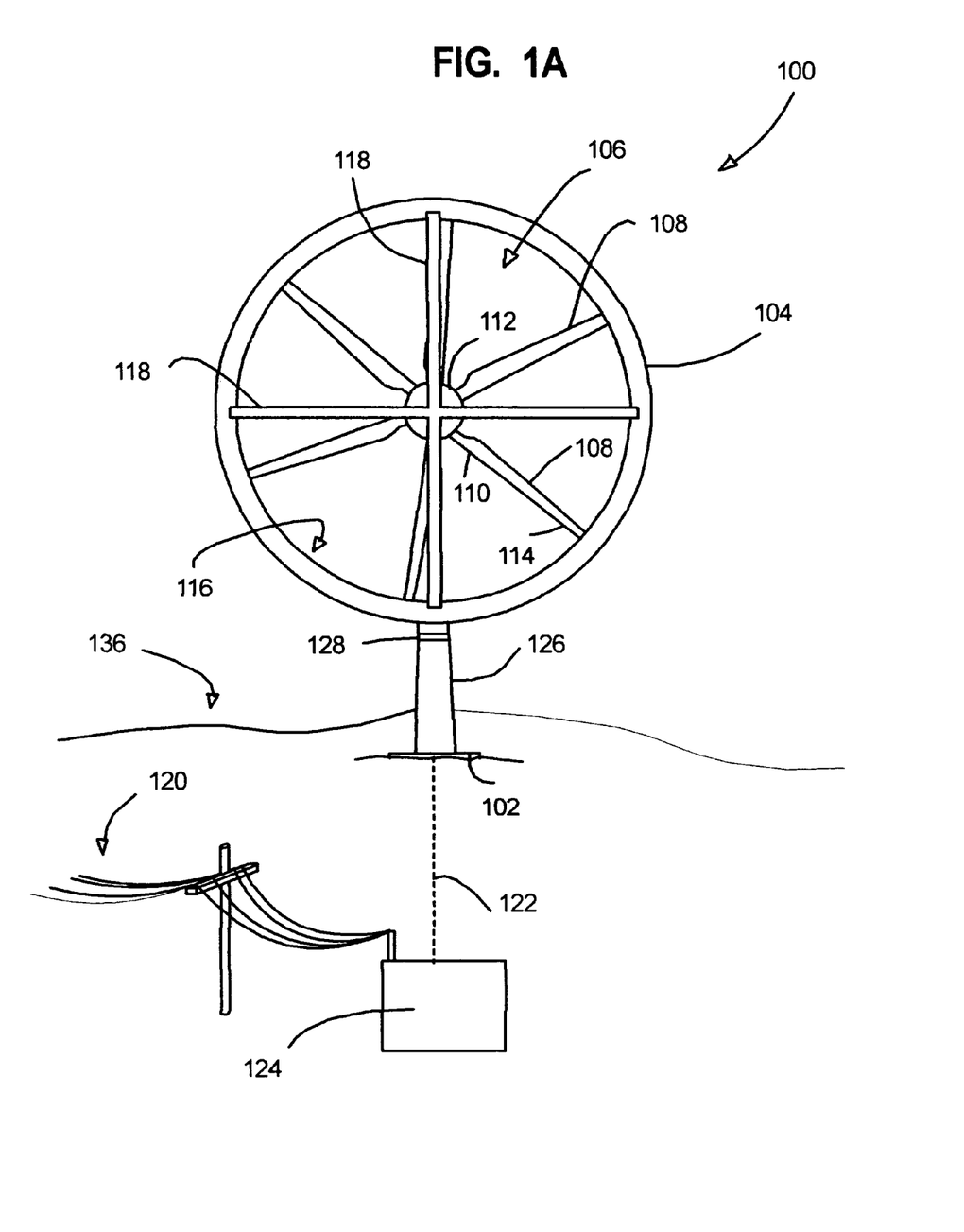
FIG. 1A is a front elevation view of a wind turbine of the present invention.

Turning to the drawings, wherein like components are designated by like reference numerals throughout the various figures, attention is initially directed to FIG. 1A which illustrates by a frontal view of an improved wind turbine 100 constructed according to the present invention.

As best shown in FIG. 1A, the improved wind turbine 100 is mounted upon a base structure 102 in a location having a sufficient wind to provide economical electrical power to a power grid 120. This location is typically on a ridge 136 or the like or near the coastline. The wind turbine 100 has a rotor 106 and a guide track 104 of circular shape. The rotor 106 has a plurality of blades 108. The proximal ends 110 of the blades 108 are mounted to a central support 112 that rotates about a horizontal axis. The distal ends 114 are mounted to a blade ring 116, FIG. 4, that travels within the guide track 104. It should be understood that the blade ring 116 acts as an electrical rotor in one function, and serves several other functions in the present invention. In one function, the blade ring 116 provides support to the blades 108. In another function it provides locations for devices that may serve to generate electricity as well as locations for devices for providing magnetic levitation as will be disclosed herein. External front supports 118 are provided to secure the guide track 104. It should be understood that the wind turbine 100 might be 100 feet in size. Clearly, a number of wind turbines 100 may be co-located to provide a wind energy farm. An electrical output 122 from each wind turbine 100, only one shown, feeds into a central facility 124 that outputs electrical energy onto the power grid 120.

Figure 1B:
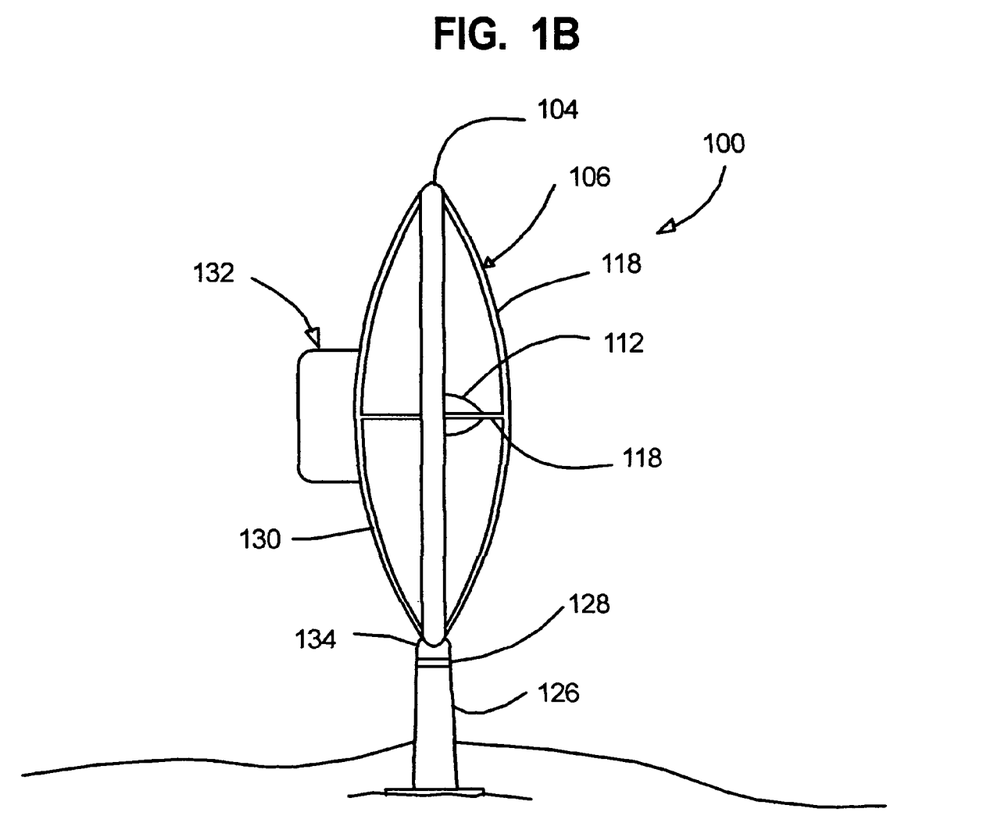
FIG. 1B is a side elevation view of the wind turbine as shown in FIG. 1A of the present invention.

FIG. 1B is a side view of the wind turbine 100 as shown in FIG. 1A. As seen therein, external rear supports 130 further add to the rigidity of the wind turbine 100. Attached to one or more rear supports 130 are one or more wind rudders 132, only one shown. These would be of conventional construction. These should be of a predetermined size to be able to cause the rotor 106 and the guide track 104 to be turned so that the wind direction is perpendicular to the face of the rotor 104 to maximize the force of the wind on the blades 108. A rotation device 128 is attached between a base 134 to which the guide track 104 is attached and to the tower pedestal 126. An un-powered rotation device 128 would consist of bearings between the base 134 and the pedestal 126. The base 134 would rotate about a vertical central axis therein. Due to the inherent friction therein, minor wind changes may not cause the base 134 to rotate until a lower wind speed value is reached. The rotation device 128 may include a magnetic levitation system as disclosed below to reduce turning friction.

Figure 2:
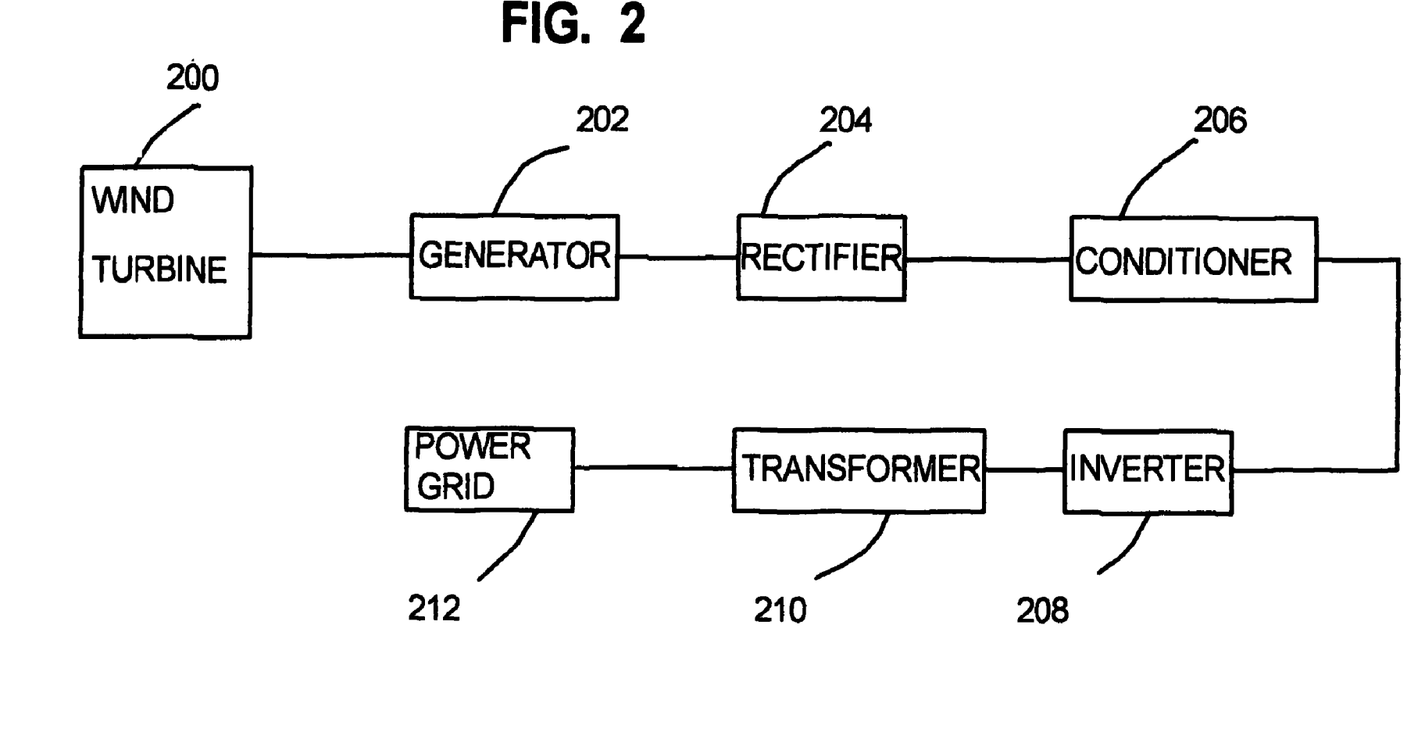
FIG. 2 is an electrical block diagram of an electrical system for inputting electrically generated power into a power grid by the present invention.

FIG. 2 illustrates a wind turbine 200 for generating electricity. For example, a generator 202 is connected to the wind turbine 200 and produces AC current. Because the AC current is not of a proper phase or voltage, it must be modified to be input onto a power grid 212. A rectifier 204 converts the AC current into DC current. A storage device, not shown, may be used to store power during non-demand periods. A conditioner 206 may remove undesired effects such as transient surges. In order to input power into the power grid 212, the current must be of the proper phase and voltage. An inverter 208 changes the DC to AC of the proper phase and frequency. Because normally transmission lines operate at a very high voltage, the voltage is adjusted by a transformer 210. These items are considered conventional in the art of power transmission and shown in the incorporated references. Further if the generator produces DC current, the rectifier 204 is not required.

Figure 3A:
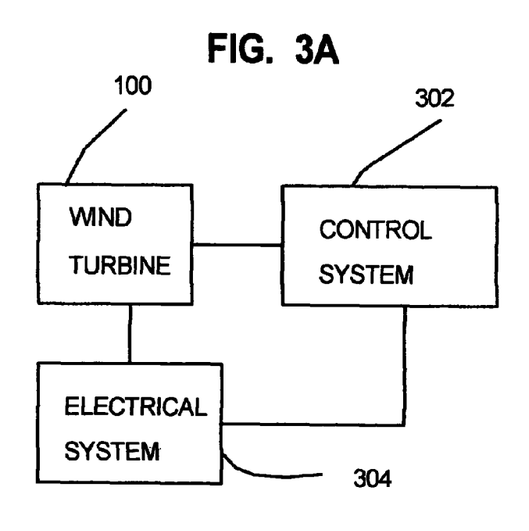
FIG. 3A is an electrical block diagram of a control system for the wind turbine of the present invention.
Figure 3B:
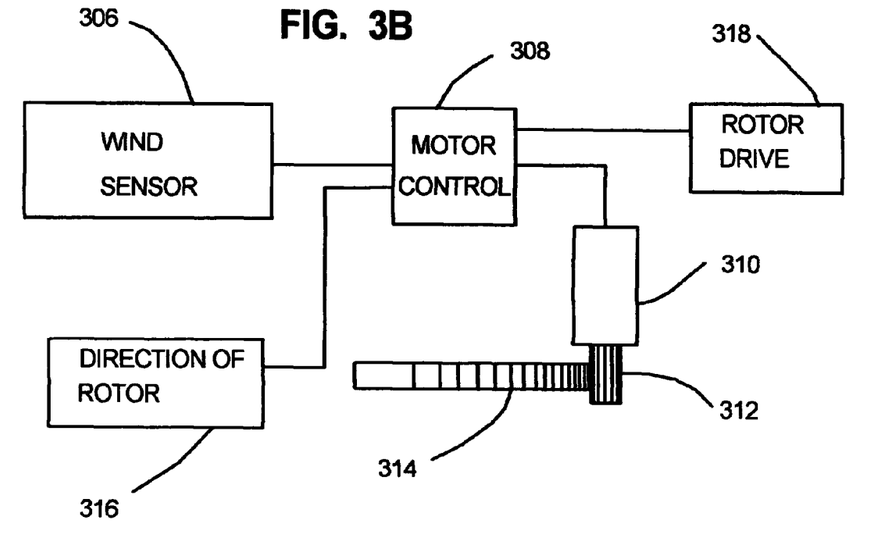
FIG. 3B illustrates another aspect of the electrical block diagram of FIG. 3A for a means for controlling the direction of the rotor of the present invention.

FIG. 3A illustrates by block diagram the operation of the wind turbine 100. The control system 302 would monitor relevant variables as output by the wind turbine 100 and an electrical system 304 to insure that the system remained within safe operating conditions. In FIG. 3B, for example, a wind sensor 306 would measure wind direction and wind speed. Based on the direction of the rotor 316 and a sufficient wind speed as measured by the wind sensor 306, a motor control 308 would activate motor 310 attached to the pedestal 126 and turn a large gear 314 in the rotation device 128 by a drive gear 312. Further, if the rotor 106 has been stationary due to low or no wind speed, an increasing wind speed over a certain criteria would also activate the motor control 308 to start the rotation of the rotor 106 by means of a rotor drive 318 until a sufficient rotation, measured for example by the output current from the generator 202, is achieved and the wind at that point is able to drive the rotor 106. The rotor drive 318 may be an electro-mechanical motor such as motor 310 or may be a magnetic levitation system used in the wind turbine 100.

Figure 3C:
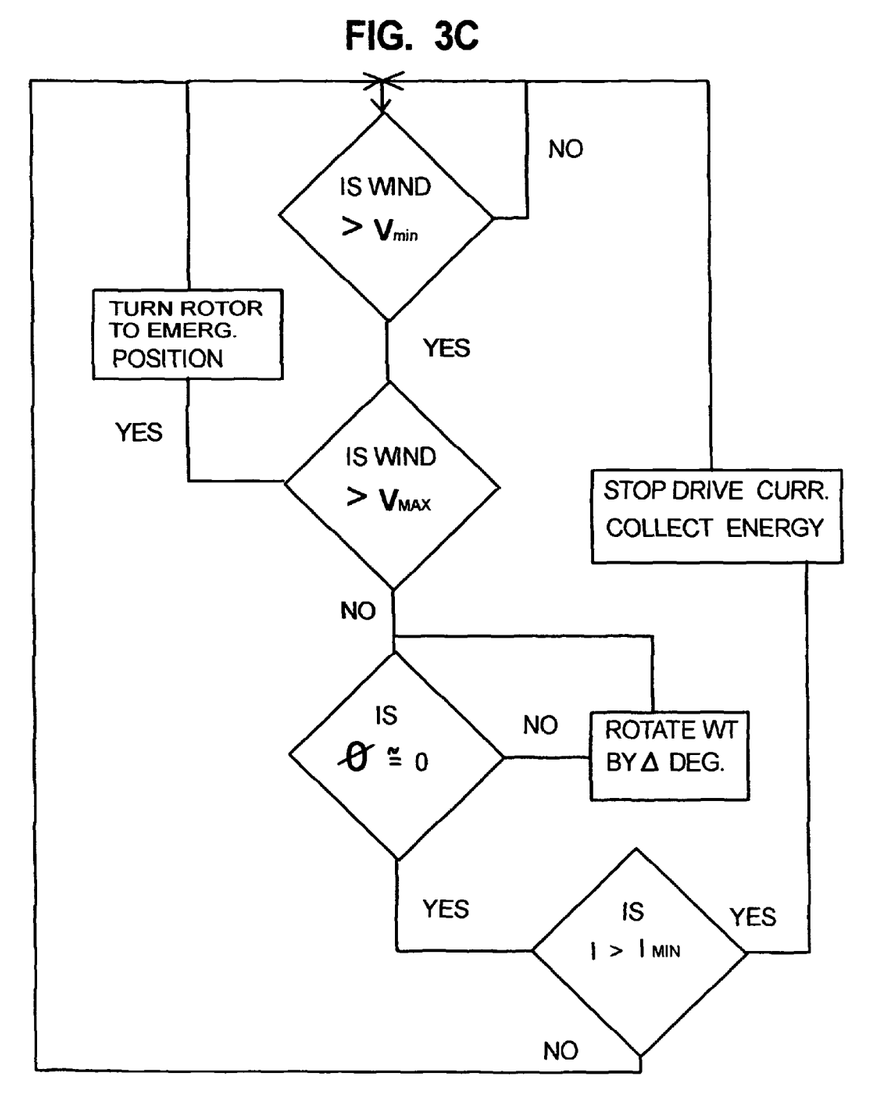
FIG. 3C is a flow diagram for operating the means for controlling the direction as shown in FIG. 3B.

FIG. 3C illustrate the process of operating the motor control 308 based upon the wind speed and direction of the wind. Rotating power would only be furnished to the rotor drive 318 if the wind is between a certain minimum value and a maximum value. Once the minimum current is reached in the electricity generating system, no further current would be required by a levitation system 700 noted below, although other types of magnetic levitation systems may require current from the electricity generating system to operate.

Figure 4:
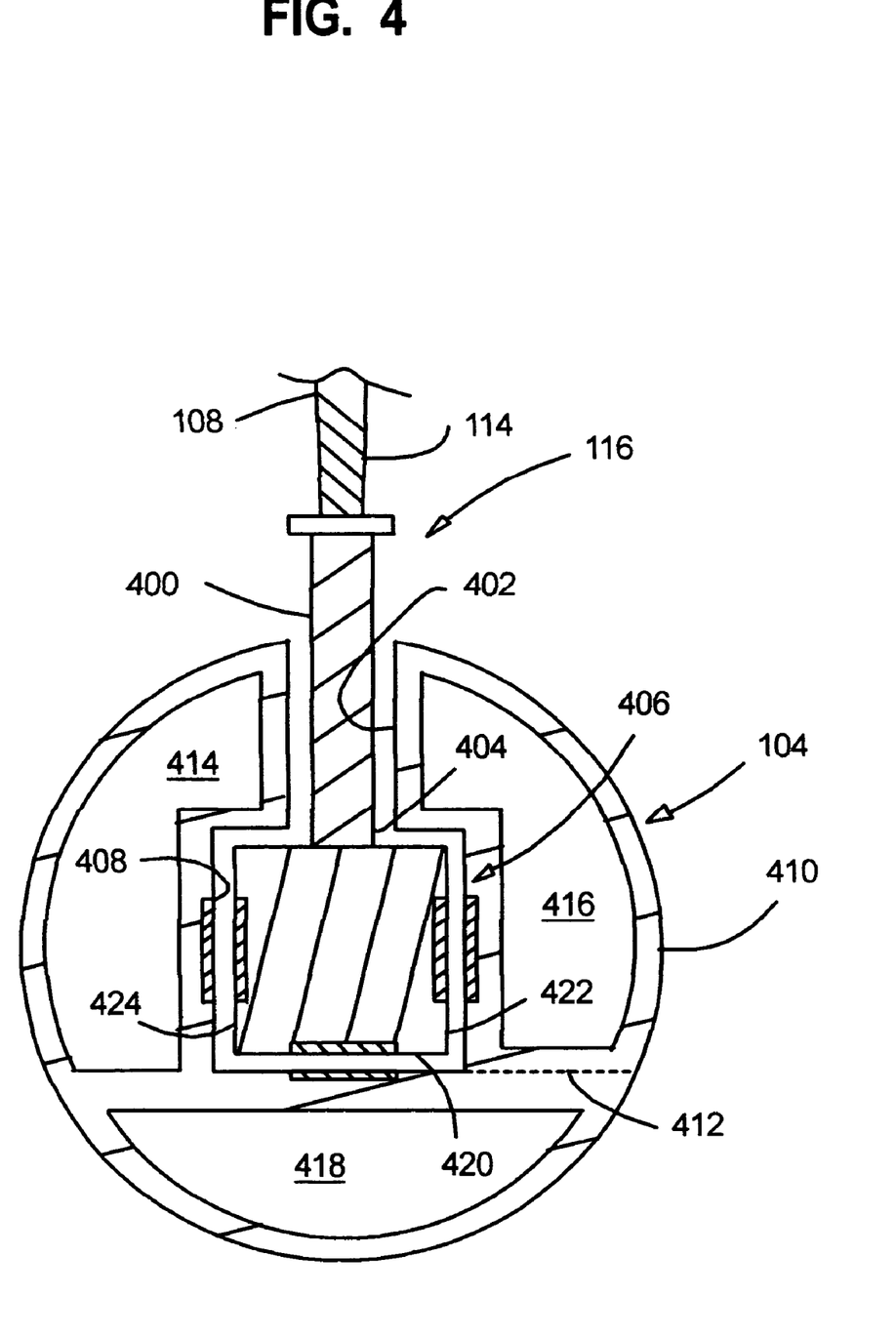
FIG. 4 is a cross section view through a blade ring and a guide track of the wind turbine of the present invention.

Referring to FIG. 4 being a cross section of the guide track 104 and the blade ring 116, the blade ring 116 is attached to the proximal end 114 of the blade 108. A ring section 400 is attached to all of the blades and travels within a ring channel 402. Attached at a bottom 404 of the ring section 400 is a carrier 406. The carrier 406 travels within a carrier channel 408 in a frictionless manner as will be described below. The carrier 406 is inserted into the carrier channel 408 by removing a track sector 410. The track sector 410 is secured to the guide track with bolts, not shown, being placed at or near the separation line 412. The guide track 104 is made of heavy sheet metal or other material of a tubular design having hollow sections 414, 416, and 418 in which wiring may travel. The carrier 406 may be continuous about the ring section 400 or may be segmented into a plurality of sections, abutting or not abutting each other. The carrier 406 as shown is of a rectangular design having a bottom 420 and two vertical sides 422 and 424. Other shapes may be feasible, but they must provide support to the devices to be described hereafter.

Figure 7:
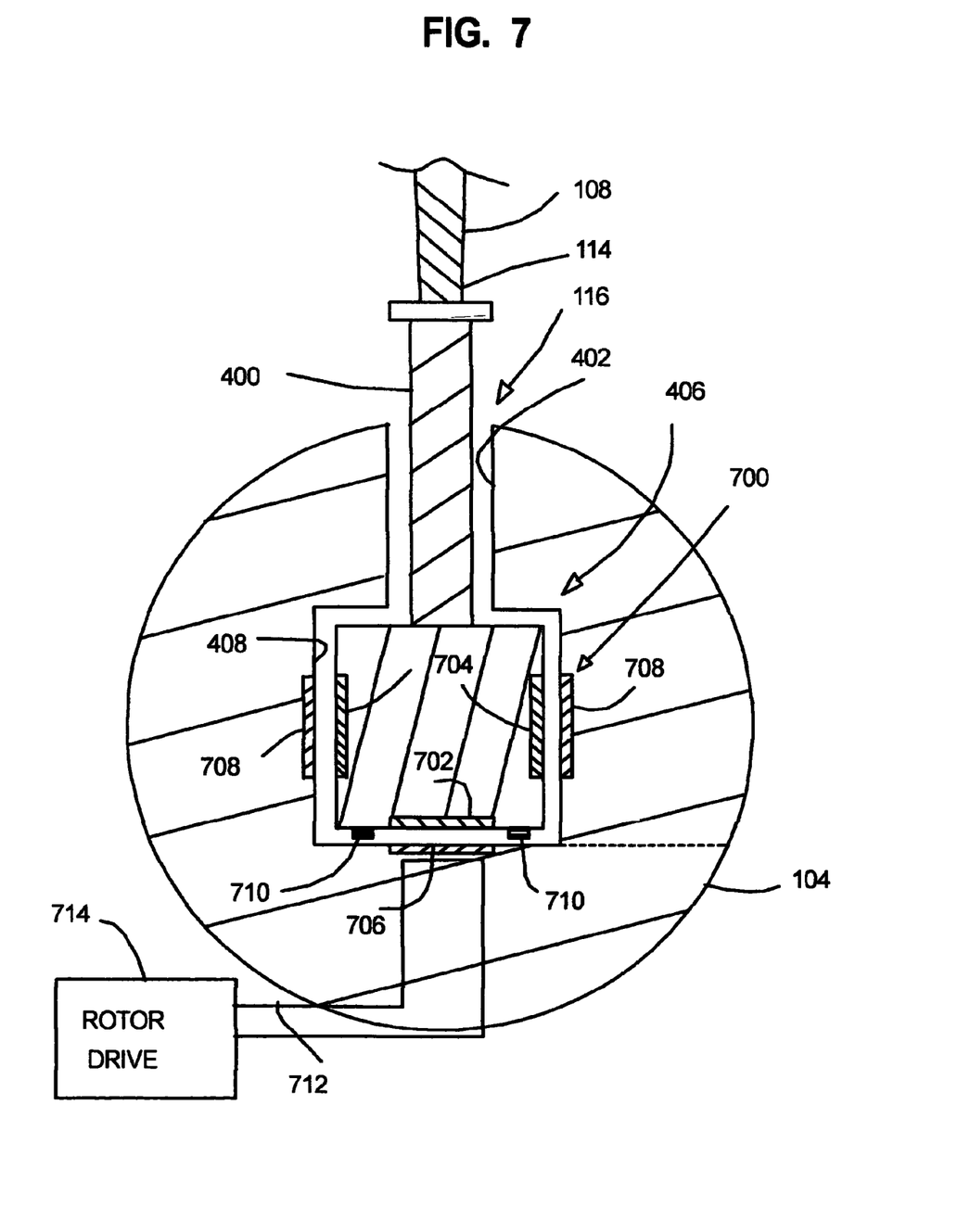
FIG. 7 is a schematic illustration of a magnetic levitation (maglev) system for providing support to the rotor of the wind turbine of the present invention.

As noted above, one feature of the present invention is that there is no central axis for supporting the rotor 106. Referring to FIG. 7, the carrier 406 is transported and supported by a magnetic levitation system 700. This system 700 is, in the preferred embodiment, termed an Inductrack system and is described in U.S. Pat. Nos. 5,722,326; 6,664,880; and 6,758,146 and U.S. Patent Publication 2005/0204948, which are incorporated by reference. The system 700 uses permanent magnets in the moving body, i.e., the carrier 406, and unpowered wire circuits in the track, or in the present invention, the carrier channel 408. The carrier has a magnet array 702 with the guide track 104 having a loop array 706 facing each other and providing vertical levitation. Since the rotor 106 has no external support, horizontal wind forces would tend to push the carrier 406 into the walls of the carrier channel 408. In order to prevent this, another set of arrays are mounted in the walls. Magnet wall arrays 704 are facing loop wall arrays 708. Because there is no wind at times, the rotor 106 and its carrier 406 will stop, and when this occurs, a plurality of letdown wheels 710 mounted in the bottom of the carrier 406 will then come into contact with a section of the floor at the bottom of the carrier channel 408 of the wind turbine 100. The letdown wheels 710 may be mounted in the bottom of the carrier channel 408 nearest the ground also. After the wind reaches a certain speed, a rotor drive 714 or 318 inputs current into a drive conductor 712 which will begin to move the rotor 106. This current may be omitted if the wind reaches a higher speed to move the rotor 106 irrespective of friction. See FIG. 3C.

Figure 5:
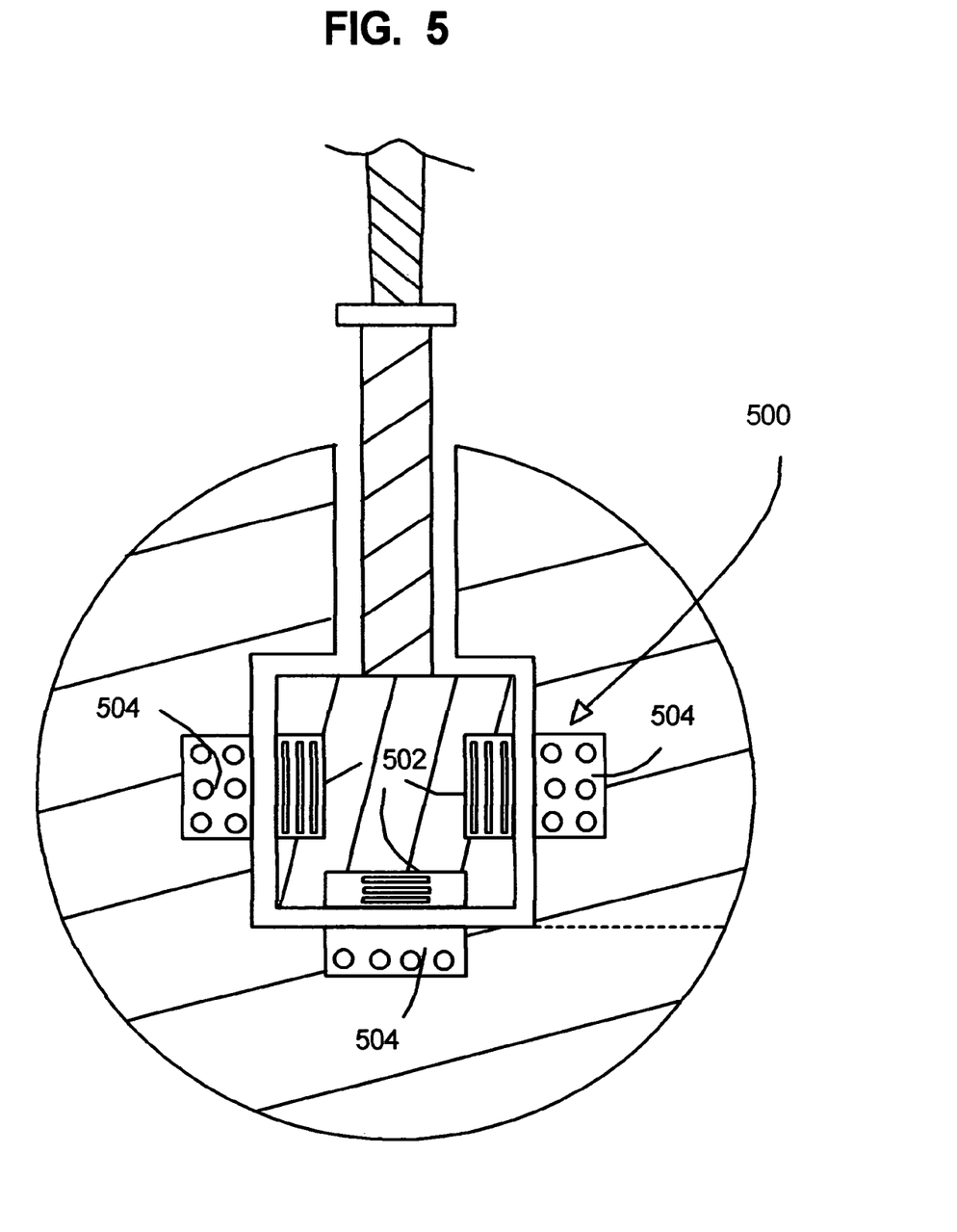
FIG. 5 is a schematic illustration of one embodiment for removing energy from a rotor of the wind turbine of the present invention.
Figure 6:
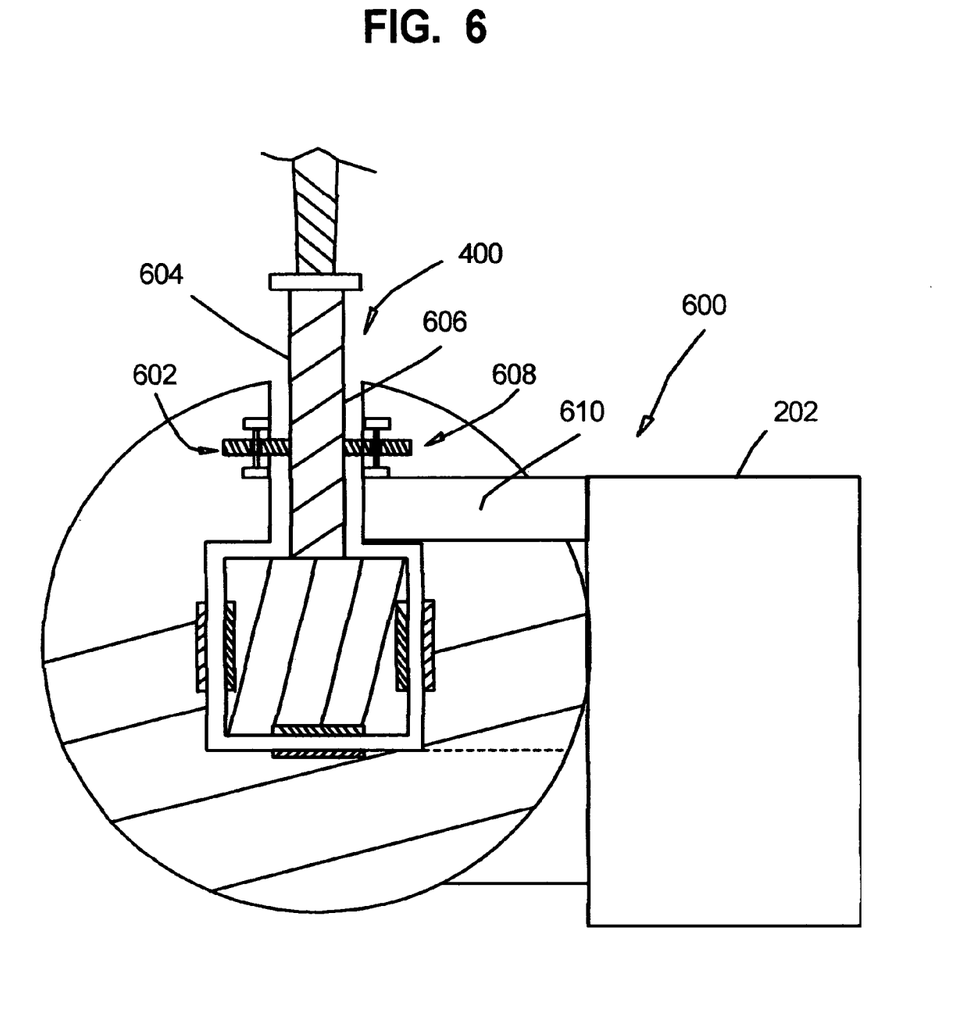
FIG. 6 is a schematic illustration of another embodiment for removing energy from a rotor of the wind turbine of the present invention.

In order to remove and convert the rotational energy from the wind turbine 100, an electro-magnetic system 500, FIG. 5, or an electro-mechanical system 600, FIG. 6, are shown. In FIG. 6, an idler wheel 602 runs against a side 604 of the blade ring 400. On the other side 606, a driven wheel with rotary shaft 608 is powered by the rotation of the rotor 106. The driven wheel with rotary shaft 608 is coupled to a transmission 610 that in turn drives a generator 612 that outputs either AC or DC current. A preferred embodiment for obtaining electrical power from the rotor 106 is shown in FIG. 5 where permanent magnet arrays 502 are coupled to loop arrays 504 in the guide track 104 to generate electricity as the rotor 106 rotates by the force of the wind. The technology for converting rotational movement into electricity is well known and is shown in such basic patents as U.S. Pat. No. 222,881 by Edison that discloses a DC dynamo. An AC induction motor is shown in U.S. Pat. No. 359,748 to Tesla.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An improved wind turbine comprising:
   a turbine rotor, said turbine rotor having one or more blades, the blades attached at one end to a center of said turbine rotor, said center being a horizontal axis of rotation of a turbine blade ring, the blades attached at an opposite end to a blade ring, said turbine rotor having no external support;
   a guide track, said guide track being circular, said blade ring traveling within said guide track;
   a rotatable base, said guide track being mounted to said rotatable base;
   a tower, said rotatable base mounted to said tower, said tower fixedly mounted to a ground structure;
   means for generating electricity attached to said blade ring and to said guide track; and
   means for providing frictionless rotation of said turbine rotor in said guide track, wherein said means for providing frictionless rotation of said blade ring in said guide track comprises magnetic levitation devices therein.

2. The improved wind turbine as recited in claim 1, further including one or more wind rudders attached to said guide track, said rudder moving said turbine rotor wherein a direction of wind is perpendicular to a plane within the rotor.

3. The improved wind turbine as recited in claim 1, wherein said means for generating electricity comprises:

means for converting the rotary motion of said turbine rotor to a rotary shaft, said rotary shaft being located on said guide track; and a generator, said generator being driven by said rotary shaft, said generator outputting electricity, said generator being located on said guide track.

4. The improved wind turbine as recited in claim 1, further including means for providing frictionless rotation of said blade ring in said guide track perpendicular to a direction of rotation.

5. The improved wind turbine as recited in claim 1, further including means for providing rotation of said guide track to said tower to reduce friction, wherein said means is a magnetic levitation system.

6. The improved wind turbine as recited in claim 1, wherein said means for generating electricity comprises:

electro-magnetic means for converting the rotary motion of said turbine rotor into electricity.

7. The improved wind turbine as recited in claim 6, wherein said means for generating electricity comprises:

electro-magnetic means for converting the rotary motion of said turbine rotor into electricity, wherein magnetic devices are attached to said blade ring, and predetermined wiring within said guide track converts moving magnetic fields of said magnetic devices into electricity.

* * * * *